Sept. 15, 1953 J. W. GIBNEY 2,651,792
SUPPORT FOR TAPS
Filed April 7, 1950 2 Sheets-Sheet 1
FIG. 1
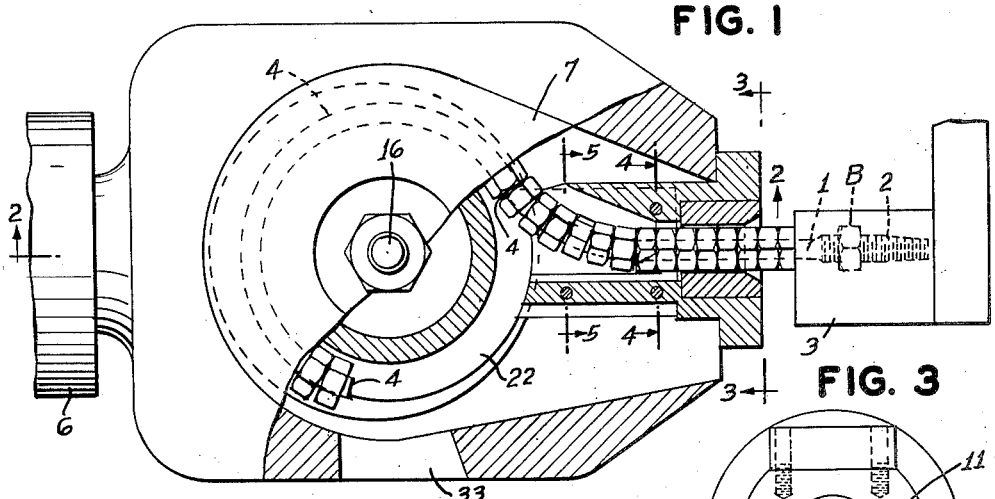
FIG. 3
FIG. 2
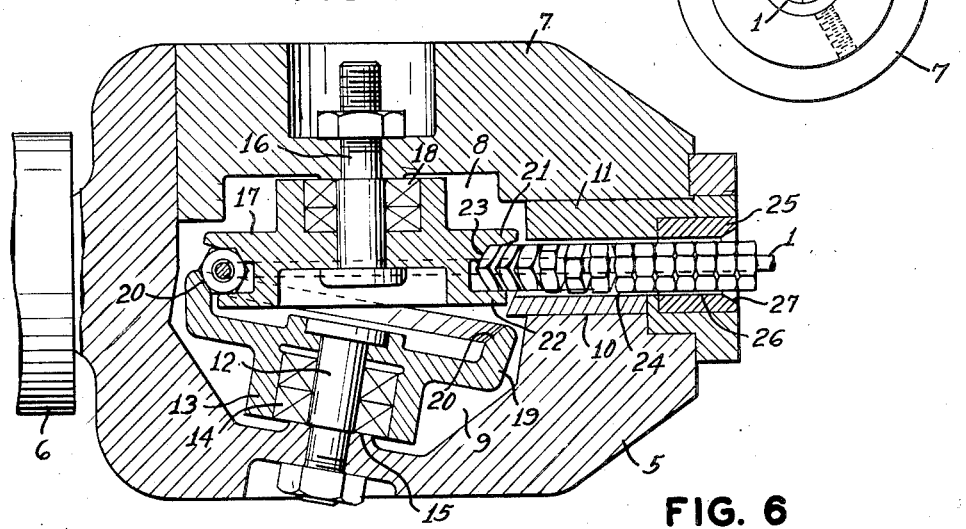
FIG. 4  FIG. 5
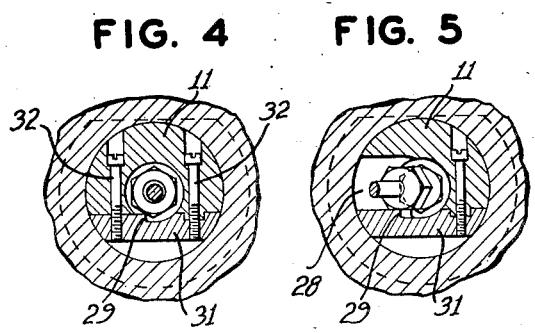
FIG. 6
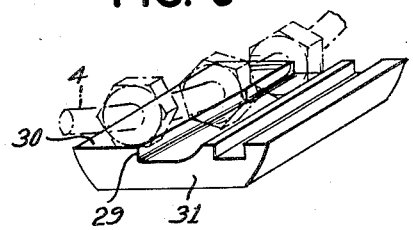
INVENTOR
Joseph W. Gibney
BY
ATTORNEYS Sept. 15, 1953 J. W. GIBNEY 2,651,792
SUPPORT FOR TAPS
Filed April 7, 1950 2 Sheets-Sheet 2

INVENTOR
Joseph W. Gibney
BY
Pennie, Edmonds, Morton and Barrows
ATTORNEYS

Patented Sept. 15, 1953

2,651,792

UNITED STATES PATENT OFFICE 2,651,792

SUPPORT FOR TAPS

Joseph W. Gibney, Port Chester, N. Y., assignor to Russell, Burdsall & Ward Bolt and Nut Company, Port Chester, N. Y., a corporation of New York Application April 7, 1950, Serial No. 154,616

5 Claims. (Cl. 10—129)

This invention relates to taps for threading nut blanks and more particularly to a support for a continuous tap whereby the thrusts and torque to which the tap is subjected in operation are absorbed.

In carrying out the invention I provide a rotary tap that is mounted with its threaded portion co-operating with a nut holder to which the unthreaded blanks are delivered. Rotation of the tap in the openings of the blanks forms the threads and propels the blanks along the tap. Beyond the threaded portion of the tap I provide a portion forming a curved support of more than 180° curved on a center lying in the longitudinal axis of the straight portion of the tap. Suitable supporting wheels carried by a rotating support are associated with the curved supporting portion of the tap and are engaged by the nuts on the tap to properly distribute and absorb the forces to which the tap is subjected in operation.

As the nut blank engages the threads of the tap a force is exerted tending to move the tap in an axial direction. In addition, the relative rotation of the tap and the nut during the threading operation imparts a torque to the tap. By providing a support for the tap throughout a substantial arc and extending on each side of the longitudinal axis of the straight portion of the tap, both of these forces are balanced and absorbed while retaining the threaded end of the tap in proper alignment and position. This results in more accurate threading of the blanks which materially reduces breakage of taps.

In the accompanying drawings I have shown several embodiments of the invention. In this showing:

Fig. 1 is a plan view of one form of the invention, parts being shown in section;

Fig. 2 is a vertical, longitudinal, sectional view on line 2—2 of Fig. 1;

Fig. 3 is a transverse, vertical, sectional view on line 3—3 of Fig. 1;

Fig. 4 is a detailed, sectional view of a guide or positioning member on line 4—4 of Fig. 1;

Fig. 5 is a similar view on line 5—5 of Fig. 1;

Fig. 6 is a perspective view of a portion of the guide shown in Figs. 4 and 5;

Figure 7:
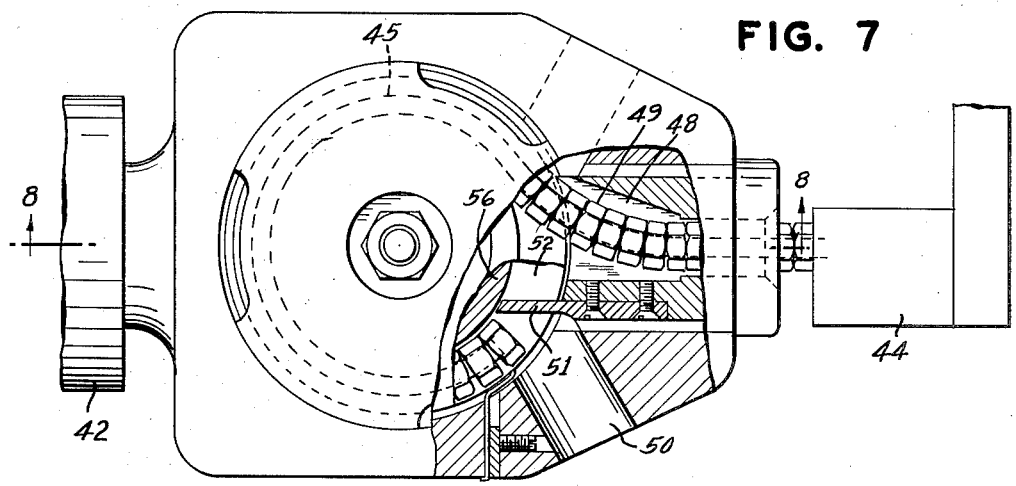
Fig. 7 is a plan view, parts being shown in section, of another form of the invention.

Referring to Figs. 1 to 6 of the drawings, the tap 1 is provided with a portion 2 having the usual cutting threads adapted to enter the hole of a nut blank to cut internal threads therein in the usual manner. The tap is rotated as hereinafter described. It cooperates with a nut holder 3 to which the blanks B are fed in any suitable manner. Rotation of the taps causes the blank to be threaded and fed along the tap. These parts are of conventional construction and a further description thereof is believed to be unnecessary.

The tap 1 extends beyond the threaded portion and is then provided with a curved portion 4 which extends throughout more than 180°. As shown, the blanks B, after leaving the threaded portion of the tap, travel along the shank and the curved portion, being propelled by succeeding nut blanks. The curved portion 4, as shown, is curved on a center lying in the longitudinal axis of the straight portion 2 of the tap.

The tap support forming the subject matter of the present invention consists of a base portion 5, mounted on a spindle 6, provided with a cap 7. The cap is secured to the base portion in any suitable manner. Within the cap and the base portion I provide recesses 8 and 9 and the forward ends of the cap and base are bored as at 10 to receive a chuck 11. Recess 9 receives a stud 12 forming a support for a guide wheel 13 mounted in suitable bearings 14. As shown, the surface 15 at the bottom of the recess is inclined and the opening which receives the stud 12 is normal to this surface so that the guide wheel 13 is in an inclined position. The recess 8 is provided with a bore to receive a stud 16 which supports guide wheel 17. This wheel is likewise provided with bearings 18. The axis of the stud 16 and the wheel 17 is perpendicular to the axis of the top support. As shown, the guide wheel 13 has a flange 19 on the upper end of which is provided a surface 20 to engage one side of a hexagonal nut as shown in Fig. 2 of the drawings. The wheel 17 has upper and lower flanges 21 and 22 engaging the upper and lower surfaces of a nut and the flange 21 has a surface 23 arranged at the proper angle to engage the side of the nut opposite to the side engaged by the surface 20.

The chuck 11 is designed to properly position the blanks axially of the tap to be engaged by the surfaces 20, 21, 22 and 23 of the guide wheels. It is provided with an axial bore 24. At its outer end, where the nut enters, it is provided with an insert or collar 25 having a bore 26 which forms a continuation of the bore 24, the end of which is flared or enlarged as at 27 to facilitate entry of the nuts into the bore. Adjacent the outlet end of the bore 24 an opening 28 is provided at the side to facilitate movement of the nuts on to the curved portion 4 of the tap (see Fig. 5). Also adjacent this point one surface of the bore 24 is shaped to form a ridge 29 which will be engaged by a corner of the nut as it passes on to the curved portion of the tap (see Fig. 6). This properly positions the nut for engagement with the surfaces of the guide wheels and as the nut leaves the guide, it passes over a surface 30 which retains it in the proper axial position until it engages the surfaces of the guide wheels. The ridge 29 and the surface 30 may be formed on a separate plate 31 secured to the guide by bolts 32. Adjacent the end of the curved portion 4 of the tap, the base 5 is provided with an opening 33 through which the nuts are delivered to suitable discharge mechanism.

In the operation of this form of the invention after each blank is threaded, it moves along the shank of the tap and as additional nuts are threaded, they propel the others along the shank and the curved portion 4 until they are delivered from the end of the curved portion into the discharge opening 33. When the nuts reach the chuck or guide 11, they pass through the bore 24. It will be apparent that, in the absence of means for properly positioning the nuts axially of the tap, the nuts would, in some instances, be delivered to the guide wheels in such position that they would not properly engage the surfaces 20, 21, 22 and 23. By providing the plate 31 with the ridge 29 so positioned that the nuts are turned just as they engage the curved portion, the nuts are caused to assume a position with two sides constituting the top and bottom, as the nuts are viewed endwise, parallel to the axis of the nut and also parallel to the surfaces 21 and 22. The provision of the surface 30 over which the nuts pass retains them in this position until they contact with the surfaces of the guide wheels. The inclined position of guide wheel 13 brings the surface 20 into engagement with a side of the nut at a position directly in alignment with the axis of the forward portion of the tap. This transmits thrust to the bearings 14, thus effectively absorbing the thrust caused by the initial engagement of the nut in the nut holder with the threaded portion of the tap. Also the engagement of the nut on the two opposite sides by the surfaces 21 and 22 absorbs the torque to which the tap is subjected by the threading operation. The result is that the threaded end of the tap is kept in line at all times resulting in more accurate threading of the nut blanks and also materially reducing the breakage of taps.

Figure 8:
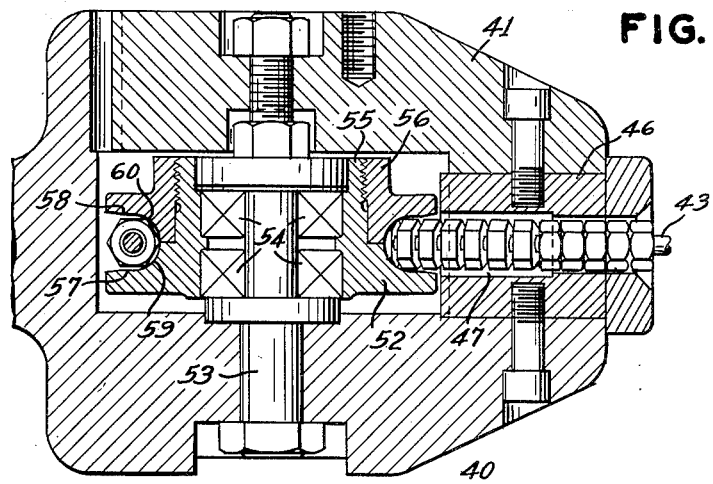
Fig. 8 is a longitudinal, sectional view on line 8—8 of Fig. 7.
Figure 9:
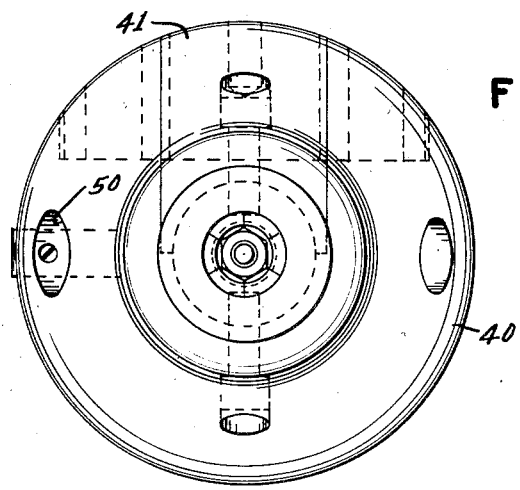
Fig. 9 is a transverse, vertical, sectional view on line 9—9 of Fig. 7.

In the form of the invention shown in Figs. 7 to 9 of the drawings the wheel supporting the curved portion of the tap is so constructed that the necessity of a guide means for properly positioning the nuts axially of the tap is eliminated. As shown, the device comprises a base 40 and a cap 41 secured to the base in any suitable manner. The base is mounted on a rotating spindle 42. Tap 43 is provided with the threaded portion (not shown) which is within the nut holder 44. This tap, as shown, has a curved portion 45, curved on the arc of a circle, extending through more than 270° and having its center lying in the longitudinal axis of the straight portion of the tap. A chuck 46 is mounted in the forward end of the base and cap and is provided with a bore 47 through which the threaded nuts pass on the shank of the tap. Adjacent the inner end of the chuck it is recessed as at 48 to receive the curved portion 49 connecting the shank 43 to the circular portion 45. The base is also provided with a discharge chute 50, and a plate or guide 51 extends across the path of the nuts just beyond the end of the tap to guide the nuts into the chute.

In this form of the invention the lower section 52 of the guide wheel is supported from stud 53 mounted in the base by means of roller bearings 54. A threaded sleeve 55 extends upwardly from the lower section of the guide wheel and an upper section 56 is mounted thereon. The upper and lower sections of the guide wheels are provided with peripheral flanges 57 and 58 which are substantially parallel to each other and these flanges merge into surfaces 59 and 60, curved on an arc of a circle.

As stated, by providing the surfaces 57, 58, 59 and 60 to be engaged by the nuts travelling along the tap, it is not necessary to align the nuts axially of the shank of the tap. These surfaces are so designed that a hexagonal nut will adjust itself to the surfaces of the wheel and form the necessary contact to support the tap. With the nuts carried by the curved portion of the tap in contact with the guide wheel through an arc of more than 270° and with the provision of the bearings 54, both axial thrusts and torque are transmitted to the bearings and absorbed by them.

I claim:

1. A tap comprising a shank having cutting threads adjacent one end, the other end of the tap forming an arc of a circle of more than 180° curved on a center lying in the longitudinal axis of the shank portion of the tap, a support for the curved portion of the tap, the support comprising a guide wheel concentric with the curved portion of the tap and having a periphery shaped to receive the curved portion of the tap and to be engaged by nuts thereon, and means for rotating the support and the tap.

2. A tap comprising a shank having cutting threads adjacent one end, the other end of the tap forming an arc of a circle of more than 180° curved on a center lying in the longitudinal axis of the shank portion of the tap, a support for the tap, the support comprising a base and a guide wheel carried by the base and positioned concentric with the curved portion of the tap, the guide wheel having a periphery shaped to receive the curved portion of the tap and to be engaged by nuts thereon, and means for rotating the support and the tap.

3. Apparatus in accordance with claim 2 wherein a guide is provided at the forward end of the base, the guide having a bore for the passage of the tap and having a surface which engages one of the faces of the nut to position it axially to properly engage the surfaces of the guide wheel.

4. A tap comprising a shank having cutting threads adjacent one end, the other end of the tap forming an arc of a circle of more than 180° curved on a center lying in the longitudinal axis of the shank portion of the tap, a support for the curved portion of the tap, the support comprising a guide wheel concentric with the curved portion of the tap, the periphery of the guide wheel being provided with flanges to engage the faces of the nuts on the curved portion of the tap to support the tap, and means for rotating the support and the tap.

5. A tap comprising a shank having cutting threads adjacent one end, the other end of the tap forming an arc of a circle of more than 180° curved on a center lying in the longitudinal axis of the shank portion of the tap, a support for the curved portion of the tap, the support comprising a guide wheel concentric with the curved portion of the tap and having a periphery shaped to receive the curved portion of the tap and to be engaged by nuts thereon, a second guide wheel having a flange to engage a face of the nuts mounted on the curved portion of the tap, and means for rotating the support and the tap.

JOSEPH W. GIBNEY.

References Cited in the file of this patent

UNITED STATES PATENTS

| Number | Name | Date |
|---|---|---|
| 678,813 | Riggs | July 16, 1901 |
| 823,225 | McKenzie | June 12, 1906 |
| 1,077,595 | Chapman | Nov. 4, 1913 |
| 1,719,568 | Spies | July 2, 1929 |
| 1,760,702 | Kosfeld | May 27, 1930 |
| 1,789,237 | Kosfeld | Jan. 13, 1931 |
| 1,882,910 | Rich | Oct. 18, 1932 |
| 2,010,432 | Koehler | Aug. 6, 1935 |
| 2,137,340 | Hebor | Nov. 22, 1938 |
| 2,180,536 | McLaughlin | Nov. 21, 1939 |
| 2,356,100 | Tangowski | Aug. 15, 1944 |